Patented Mar. 25, 1941

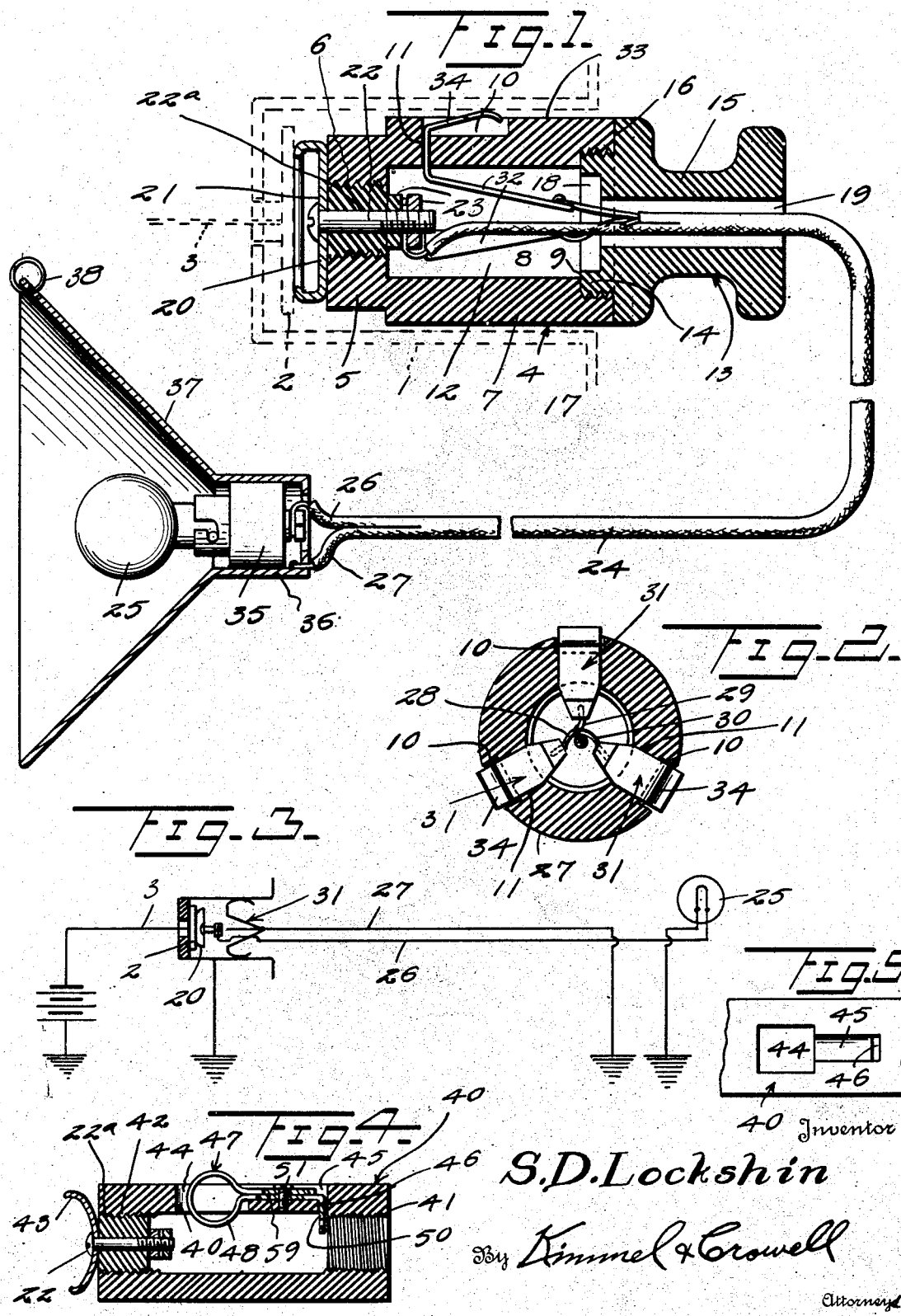

2,236,435

UNITED STATES PATENT OFFICE 2,236,435

AUTOMOBILE ACCESSORY

Samuel D. Lockshin, Mansfield, Ohio

Application June 29, 1939, Serial No. 281,983

7 Claims. (Cl. 173—361)

This invention relates to an automobile accessory of the illuminating type.

The invention aims to provide, in a manner as hereinafter set forth, an accessory of the type referred to so constructed whereby when occasion requires the current from the socket of a cigar lighter in stock model automobiles may be utilized for illuminating purposes.

The invention further aims to provide, in a manner as hereinafter set forth, an accessory of the type referred to including an extension cord type utility or emergency lamp and means for correlation with the socket of cigar lighters in stock model automobiles for utilizing, when required current from such socket for making active the lamp.

The invention further aims to provide, in a manner as hereinafter set forth, an accessory for the purpose referred to which is simple in its construction and arrangement, strong, durable, foldable in a compact manner, conveniently positioned relative to a cigar lighter socket for illuminating purposes, readily assembled, conveniently portable and inexpensive to manufacture.

Embodying the foregoing aims and others which may hereinafter appear, the invention consists of the novel construction, combination and arrangement of parts as will be more specifically referred to and illustrated in the accompanying drawing, wherein is shown an embodiment of the invention, but it is to be understood that changes, variations and modifications may be resorted to which fall within the scope of the invention as claimed.

In the drawing:

Figure 1 illustrates the accessory in side elevation and in longitudinal section and further showing the accessory in correlation with the socket of a cigar lighter, the socket being illustrated in dotted lines, Figure 2 is a vertical sectional view illustrating the arrangements of the combined resilient ground contact and retaining members for detachably securing the accessory to the socket of the cigar lighter, Figure 3 is a diagrammatic view illustrating the lighting circuit, Figure 4 is a longitudinal sectional view illustrating a modified form of case, contact for engagement with the heater and combined resilient ground contact and holder member, and Figure 5 is a fragmentary view in top plan of the case shown by Figure 4.

With reference to the drawing, 1 indicates a socket forming member for a cigar lighter, the lighter is not shown. The member 1 has attached therewith a contact 2 electrically connected as at 3 with an electrical source.

The accessory includes a plug element formed of an open front case 4 constructed from non-conducting material, preferably "Bakelite". The case 4 is of the desired diameter and of a diameter to be conveniently inserted in the member 1. The case 4 is set up with an inner end part 5 of reduced diameter and which is provided axially with an opening 6. The portion of largest diameter of the case 4 is indicated as at 7 and has its inner face formed upon two different diameters. That part of the case 4 of greatest inner diameter is indicated at 8 and is threaded. At the junction of the portions of different inner diameters of the case 4 the latter is formed with an internal shoulder 9. The outer periphery of the part 7 of the case 4 is formed with a plurality of spaced pockets 10 disposed in equidistant spaced relation and preferably the number of pockets 10 will be three and such number of pockets is shown. The pockets 10 extend lengthwise of the part 7 of the case 4 and opening into the rear side of said pockets 10 are passages 11 which lead from the chamber 12 provided by the part 7 of the case 4.

The plug element includes a pull knob 13 therefor and such knob is constructed of any suitable non-conducting material, preferably "Bakelite." The knob 13 is formed with an inner end part 14 of reduced outer diameter with respect to the inner end of the outer part 15 of the knob 13. The outer diameter of the part 15, at the inner end thereof corresponds to the outer diameter of the part 7 of the case 4. The junction of the parts 14, 15 of the knob 13 provides the latter with a peripheral shoulder 16. The part 14 of the knob 13 is formed with peripheral threads 17. The part 14 of the knob 13 is formed with a recess 18 which opens into the chamber 12. The knob 13 is formed with an axial passage 19 which leads outwardly from the recess 18 to the outer end of the knob 13. The latter is to be connected to the case 4 and for such purpose the threads on the portion 8 of the case 4 correlate with the threads on the part 14 of the knob 13 for the purpose of securing the case 4 and knob 13 together. When knob 13 is secured to case 4 the shoulder 16 of the latter abuts the outer end edge of the case 4.

Positioned against the inner end of the part 5 of the case 4 is an annular cup-shaped contact 20 for engagement with the heater 2. The contact 20 is formed with an axial opening 21 which aligns with the opening 6. The contact 20 is secured against the inner end of the case 4 by a headed threaded bolt 22 which extends through and projects forwardly from a sleeve 22ᵃ threaded in the part 5 of case 4. A pair of spaced holders 23 are arranged in the chamber 12 and threadably engage with the shank of the bolt 22, as well as being soldered to such shank.

Extending through the passage 19 and into the chamber 12 is an extension cord 24 for a utility or emergency lamp 25. One of the circuit conductors of the extension cord, and which is indicated at 26 is extended between the holders 23, electrically engaged therewith and preferably are soldered thereto. The conductor 26 is what is termed the live wire to the filament of the lamp 25. The other conductor of the cord 24 and indicated at 27 has its strands separated as indicated at 28, 29, 30 (Figure 2) and these strands are electrically connected to the forward ends of combined resilient ground contact and holder members 31 of like form, which are arranged within and extend from the chamber 12 into the pockets 10. Each of the members 31, with reference to Figure 1, includes an inner end part 32, an intermediate part 33 and an outer end part 34. The part 32 is connected to a strand of the conductor 27 and extends at an inclination from its connected end towards the wall of the chamber 12. The part 32 at its rear end merges into the inner end of the part 33. The part 33 extends outwardly through the passage 11 and merges at its outer end into the rear end of the part 34. The latter is substantially of arcuate form and when the plug element is not inserted in the member 1 the said part 34 has a portion of its length project from the pocket 10.

The lamp 25 is connected to a socket 35 electrically engaging with a sleeve 36. The conductor 26 is electrically connected to the socket 35. The conductor 27 is electrically connected to the sleeve 36. Formed integral with the outer end of the sleeve 36 is a reflector 37 provided with a hanger 38 of annular form, which is loosely connected to the reflector 37.

When the accessory is to be used, the cigar lighter is removed from the member 1. The plug element is then positioned in the member 1 to an extent to have contact 20 electrically engage the contact 2 and under such conditions the lamp 25 will be active. The members 31 coact with the inner face of the member 1 to detachably secure the accessory to member 1 to prevent, when the accessory is used under ordinary conditions of the plug element being moved out of electrical contact with the heating means 2.

With reference to Figures 4 and 5 the modified form of case, indicated at 40 has its inner and its outer diameter uniform. The inner face of case 40 has spaced groups 41, 42 of threads. The knob 13 is adapted to be connected to the case 40 by the threads 41. The sleeve 22ᵃ is secured to case 40 by the threads 42. The contact 43 (Figure 4) which is coupled or secured to the case 40 by the bolt 22 is resilient, of segmental contour and has its ends extended towards the contact 2. The body of case 40 is formed with an opening 44 with which communicates the rear end of a groove 45 formed in the outer periphery of said body lengthwise thereof. The body of case 40 is also formed with a passage 46 which opens into the forward end of groove 45 and into the case 40. A combined resilient ground contact and holder member is indicated at 47 and it is a flat strip of conducting material bent to provide a split annular rear portion 48, a horizontally disposed two part intermediate or shank portion 59 and a front portion 50 which extends inwardly from and is disposed at right angles to the forward end of the portion 59. The portion 48 is arranged within, extends outwardly and inwardly from and is depressible in the opening 44. The portion 59 is seated in groove 45, extends into opening 44 and suspends portion 48. The portion 59 intermediate its ends is secured to the body of case 40 by the holdfast means 51. The portion 50 extends through the passage 46 into the case 40. The circuit conductor 26 is to be electrically connected to the portion 50 of member 47. Otherwise than that as stated the construction shown by Figures 4 and 5 will be the same as that shown by Figures 1 and 2.

What I claim is:

1. In an automobile accessory for the purpose set forth, an electrical connecting structure for the circuit conductors of a trouble lamp disposed remote from said structure and adapted for correlation with the socket forming member, within the automobile for a cigar lighter, said structure including a tubular plug-like body of non-conducting material having coaxially arranged openings at its outer and inner ends and adapted for removably inserting into said socket member and for the passage therein from its outer end of the said conductors, said body being formed of a casing open at its inner and outer ends and a tubular pull knob extended from the outer end of said casing, an axially apertured contact positioned against the inner end edge of the casing adapted for electrical connection with an electrical source when the structure is inserted in the socket member, an axially apertured element of non-conducting material arranged within the opening at the inner end of said body and secured to said casing, an electrical conducting member extending through said contact and element into the casing, said member correlating with said contact and element and having means at its outer end for securing the contact against the inner end of the casing and having means at its other end within the casing adapted to electrically connect it to a conductor for the lamp, and resilient combined ground forming contact and plug holding means carried by said casing adapted, when the said structure is inserted in the socket member to electrically and frictionally engage with the latter, the said resilient means having a portion arranged within the casing adapted to be electricaly connected to the other conductor for the lamp, a portion extending outwardly through the body of the casing and a portion arranged exteriorly of the casing for inherently binding against the socket member.

2. In an automobile accessory for the purpose set forth, an electrical connecting structure for the circuit conductors of a trouble lamp disposed remote from said structure and adapted for correlation with the socket forming member, within the automobile for a cigar lighter, said structure including a tubular plug-like body of non-conducting material having coaxially arranged openings at its outer and inner ends and adapted for removably inserting into said socket member and for the passage therein from its outer end of the said conductors, said body being formed of a casing open at its inner and outer ends and a tubular pull knob extended from the outer end of said casing, an axially apertured contact positioned against the inner end edge of the casing adapted for electrical connection with an electrical source when the structure is inserted in the socket member, an axially apertured element of non-conducting material arranged within the opening at the inner end of said body and secured to said casing, an electrical conducting member extending through said contact and element into the casing, said member correlating with said contact and element and having means at its outer end for securing the contact against the inner end of the casing and having means at its other end within the casing adapted to electrically connect it to a conductor for the lamp, said casing having its body formed with an opening, a passage and a peripheral groove arranged between and communicating at its ends into said opening and passage, and resilient combined ground contact forming and plug holding means carried by said casing adapted, when the structure is inserted in the socket member to electrically and frictionally engage with the latter, said ground contact forming and plug holding means arranged within said opening and groove and extending through said passage into the casing for connection to the other conductor for the lamp.

3. In an automobile accessory for the purpose set forth, an electrical connecting structure for the circuit conductors of a trouble lamp disposed remote from said structure and adapted for correlation with the socket forming member, within the automobile for a cigar lighter, said structure including a tubular plug-like body of non-conducting material having coaxially arranged openings at its outer and inner ends and adapted for removably inserting into said socket member and for the passage therein from its outer end of the said conductors, said body being formed of a casing open at its inner and outer ends and a tubular pull knob extended from the outer end of said casing, an axially apertured contact positioned against the inner end edge of the casing adapted for electrical connection with an electrical source when the structure is inserted in the socket member, an axially apertured element of non-conducting material arranged within the opening at the inner end of said body and secured to said casing, an electrical conducting member extending through said contact and element into the casing, said member correlating with said contact and element and having means at its outer end for securing the contact against the inner end of the casing and having means at its other end within the casing adapted to electrically connect it to a conductor for the lamp, said casing having its body formed with an opening, a passage and a peripheral groove arranged between and communicating at its ends into said opening and passage, resilient combined ground contact forming and plug holding means carried by said casing adapted, when the structure is inserted in the socket member to electrically and frictionally engage with the latter, said resilient means arranged within said opening and groove and extending through said passage into the casing for connection to the other conductor for the lamp, and means for securing said resilient means intermediate the ends of the latter to the body of the casing.

4. In an automobile accessory for the purpose set forth, an electrical connecting structure for the circuit conductors of a trouble lamp disposed remote from said structure and adapted for correlation with the socket forming member, within the automobile for a cigar lighter, said structure including a tubular plug-like body of non-conducting material having coaxially arranged openings at its outer and inner ends and adapted for removably inserting into said socket member and for the passage therein from its outer end of the said conductors, said body being formed of a casing open at its inner and outer ends and a tubular pull knob extended from the outer end of said casing, an axially apertured contact positioned against the inner end edge of the casing adapted for electrical connection with an electrical source when the structure is inserted in the socket member, an axially apertured element of non-conducting material arranged within the opening at the inner end of said body and secured to said casing, an electrical conducting member extending through said contact and element into the casing, said member correlating with said contact and element and having means at its outer end for securing the contact against the inner end of the casing and having means at its other end within the casing adapted to electrically connect it to a conductor for the lamp, and a plurality of resilient combined ground forming contact and plug holding elements disposed in radially extended relation with respect to said casing adapted, when the said structure is inserted in the socket member to electrically and frictionally engage with the latter, each of said resilient elements having a portion arranged within the casing, a portion extending outwardly through the body of the casing and a portion arranged exteriorly of and inherently binding against the socket member, the portions of the resilient elements arranged within the casing adapted to be electrically connected to the other conductor for the lamp.

5. In an automobile accessory for the purpose set forth, an electrical connecting structure for the circuit conductors of a trouble lamp disposed remote from said structure and adapted for correlation with the socket forming member, within the automobile for a cigar lighter, said structure including a tubular plug-like body of non-conducting material having coaxially arranged opening at its outer and inner ends and adapted for removably inserting into said socket member and for the passage therein from its outer end of the said conductors, said body being formed of a casing open at its inner and outer ends and a tubular pull knob extended from the outer end of said casing, an axially apertured contact positioned against the inner end edge of the casing adapted for electrical connection with an electrical source when the structure is inserted in the socket member, an axially apertured element of non-conducting material arranged within the opening at the inner end of said body and secured to said casing, an electrical conducting member extending through said contact and element into the casing, said member correlating with said contact and element and having means at its outer end for securing the contact against the inner end of the casing and having means at its other end within the casing adapted to electrically connect it to a conductor for the lamp, said casing having its body formed with a plurality of openings, a plurality of spaced passages laterally aligned with said openings and a plurality of peripheral grooves, each groove being arranged between and communicating at its ends with an opening and a passage, and a plurality of resiliently combined ground forming contact and plug holding element carried by said casing, each of said resilient elements having a portion mounted in a groove, a shiftable portion suspended in said opening for inherently engaging both electrically and frictionally with the socket member and another portion extending through a passage into the casing, the said portions extended through said passages into the casing adapted to be electrically connected to the other conductor for the lamp.

6. In an automobile accessory for the purpose set forth, an electrical connecting structure for the circuit conductors of a trouble lamp disposed remote from said structure and adapted for correlation with the socket forming member, within the automobile for a cigar lighter, said structure including a tubular plug-like body of non-conducting material having coaxially arranged openings at its outer and inner ends and adapted for removably inserting into said socket member and for the passage therein from its outer end of the said conductors, said body being formed of a casing open at its inner and outer ends and a tubular pull knob extended from the outer end of said casing, an axially apertured contact positioned against the inner end edge of the casing adapted for electrical connection with an electrical source when the structure is inserted in the socket member, an axially apertured element of non-conducting material arranged within the opening at the inner end of said body and secured to said casing, an electrical conducting member extending through said contact and element into the casing, said member correlating with said contact and element and having means at its outer end for securing the contact against the inner end of the casing and having means at its other end within the casing adapted to electrically connect it to a conductor for the lamp, said casing having its body formed with a plurality of openings, a plurality of spaced passages laterally aligned with said openings and a plurality of peripheral grooves, each groove being arranged between and communicating at its ends with an opening and a passage, a plurality of resiliently combined ground forming contact and plug holding elements carried by said casing, each of said resilient elements having a portion mounted in a groove, a shiftable portion suspended in said opening for inherently engaging both electrically and frictionally with the socket member and another portion extending through a passage into the casing, the said portions extended through said passages into the casing adapted to be electrically connected to the other conductor for the lamp, and means for anchoring the portions of said elements mounted in said grooves to the body of the casing.

7. In a device for the purpose set forth a casing having coaxially arranged openings at its inner and outer ends having the walls thereof threaded, a tubular knob extended from the outer end of and threadedly engaging at its inner end with the threads of the wall of the opening at the outer end of said casing, the body of the casing formed intermediate the ends thereof with an opening, a passage spaced forwardly from and aligned with said opening and communicating with the interior of the casing and a peripheral groove disposed lengthwise thereof and communicating at its rear end with said opening and at its forward end with the outer end of said passage, a peripherally threaded axially apertured non-conducting element threadedly engaging with the threads of the wall of the opening at the inner end of the casing, an axially apertured contact arranged against the inner end of said casing and element, an electrical conducting member extending through said contact and element having means at one end for securing the contact against the inner end of the casing and means at its other end arranged within the casing adapted for electrically connecting said member to a conductor, and resilient combined ground contact forming and casing holding means carried by the casing and having an apertured part extending through said passage into the casing for connection to another electrical conductor, a part arranged within said groove and secured intermediate its ends to the casing and a resilient loop-shaped part disposed in and extending outwardly and inwardly with respect to said casing.

SAMUEL D. LOCKSHIN.